United States Patent Office 3,561,933
Patented Feb. 9, 1971

3,561,933
FLOCCULATION PROCESS
Alfred J. Restaino, Wilmington, Del., and Weldon N. Reed, Pennington, N.J., assignors to Atlas Chemical Industries, Inc., Wilmington, Del., a corporation of Delaware
No Drawing. Application Feb. 13, 1963, Ser. No. 258,119, which is a continuation-in-part of application Ser. No. 177,150, Mar. 2, 1962, both now abandoned. Divided and this application Nov. 10, 1966, Ser. No. 593,320
Int. Cl. B01d 11/02, 21/01; C01f 7/04
U.S. Cl. 23—312                               11 Claims This application is a division of application Ser. No. 258,119, filed Feb. 13, 1963, now abandoned, which is, in turn, a continuation-in-part of application Ser. No. 177,150, filed Mar. 2, 1962, now abandoned. It relates to the utilization of graft copolymers as flocculating agents.

A number of techniques for preparing graft copolymers of vinyl compounds and polymeric substrates have been proposed. Thus, the high-energy irradiation of a polymeric substrate dissolved or swollen in a vinyl monomer is reported in a number of patents to induce the formation of graft copolymers. It has been proposed, alternatively, to form free radicals in polymeric substrates by irradiation thereof in the substantial absence of oxygen, and to subsequently contact the substrate with vinyl monomer.

Conventional chemical processes for forming graft copolymers have likewise been suggested wherein peroxide groups are introduced into the substrate by reaction with ozone or other oxidizing agent and the peroxidized product brought into contact with a vinyl monomer. It has further been reported that graft copolymers of starch may be prepared by reaction of starch and a vinyl monomer in the presence of aqueous hydrogen peroxide and ferrous ion catalyst.

However, these several proposed procedures for preparing graft copolymers have disadvantages which have mitigated against their commercial utilization. Thus the simultaneous irradiation of substrate and vinyl monomer induces homopolymerization of the monomer as well as copolymerization with the substrate. Especially with water-soluble vinyl monomers such as acrylamide or acrylic acid homopolymerization is favored, and the proportion of monomer grafted onto the substrate is unsatisfactorily small. When this difficulty is circumvented by preirradiation of the substrate to form stored free radicals and subsequently introduce the vinyl monomer to the system, it has been necessary to operate throughout in an atmosphere substantially free of oxygen, a condition which presents obvious difficulties.

Grafting methods based on the introduction of peroxide groups into polymeric substrates by chemical reaction are of limited applicability. When the substrate is starch, or other water dispersible polymer, oxidation conditions sufficiently stringent to introduce a useful number of peroxide groups bring about excessive degradation of the substrate polymer. In graft copolymers formed from such peroxidized substrates, the contribution of the high molecular weight of the polymeric substrate to the physical properties of the graft is in large measure lost.

The formation of starch graft copolymers by reacting vinyl monomers with starch in the presence of aqueous hydrogen peroxide and ferrous ion is a very inefficient process in that the free radicals are formed in the solution phase leading to a large amount of homopolymerization of the vinyl monomer. Grafting to the substrate occurs only when transfer of free radical sites to the starch occurs and the chain transfer constant for starch is so low that only a small amount of grafting takes place.

In accordance with this invention graft copolymers of vinyl monomers to water dispersible polymeric substrates are formed in a two stage process. In the first step peroxide or hydroperoxide radicals are introduced into the substrate with the aid of high energy ionizing radiation and, in the second, the peroxidized substrate is brought into contact with an aqueous dispersion of a vinyl monomer containing, in the aqueous phase, a catalyst capable of producing free radicals by reaction with hydroperoxides.

In the first stage the water-dispersible polymeric substrate, in any convenient form such as powder, flake, film, fiber, and irradiated with high energy ionizing radiation, is contacted with oxygen. The oxygen may be, and preferably is, present during the irradiation. Less conveniently, but with fully satisfactory results, the substrate may be irradiated in the absence of oxygen, i.e. after degassing or nitrogen flushing, and subsequently aerated or otherwise contacted with oxygen to introduce the hydroperoxide groups.

The hydroperoxide thus formed are remarkably stable and may be stored, under ordinary conditions, for extended periods, at least as long as a year, without losing their capability to form graft copolymers with vinyl monomers in the second stage of the process to be described hereinafter. This makes it possible to segregate the radiation step of the process, both in time and space, from the subsequent copolymerization step. Considering the shielding and other precautions necessary to any process involving the use of high energy ionizing radiation, the operational advantages of such isolation are obvious.

The high energy radiation employed may be electromagnetic or particulate and includes accelerated electrons, protons, neutrons, etc., as well as X-rays and gamma rays. The radiation dosage should be such that at least 10 parts per million (p.p.m.) by weight and preferably at least 100 p.p.m. of hydroperoxide radicals are formed when the irradiated substrate is brought into contact with an oxygen-containing atmosphere either concomitantly with, or subsequent to, the irradiation. The minimum radiation dosage required to effect the desired degree of peroxidation will vary somewhat with the nature of the polymeric substrate and can readily be determined by simple experimental test. In general dosages of at least 0.1 megarad, and preferably ranging upwards from 0.5 megarad will be found useful. The amount and concentration of oxygen with which the irradiated substrate is contacted is not critical as long as the stoichiometric quantity to furnish the desired proportion of hydrogen peroxide is supplied.

With increasing radiation dosage the extent of peroxidation will be increased and, at excessive dosages, objectionable degradation of the polymeric substrate may occur. In general dosages to effect the introduction of not more than 1000 p.p.m. by weight of hydroperoxide groups into the substrate are preferred, which concentration usually requires up to from 10 to 15 megarads depending upon the nature of the substrate. Under these conditions peroxidized starch containing an average of at least one hydroperoxide group per starch chain can be obtained. Useful products are obtained with higher dosages although degradation of the substrate to lower molecular weight fragments increases noticeably as the dosage increases, and dosages of more than 30 megarads are considered outside the scope of the invention. The radiation may be conducted at any convenient temperature although to minimize thermal decomposition of the formed hydroperoxides it is preferred to keep the temperature in this stage below about 70° C.

The polymeric substrate employed in the invention and subjected to radiation-induced peroxidation may be any water-dispersible polymer. It may be a naturally occurring polymer or one derived therefrom, such as starch, casein, algin, dextrin or dextran, or it may be a synthetic polymer such as polyvinyl alcohol, or a polymeric condensate of a 2–3 carbon alkylene oxide. The alkylene oxide condensate may be hydroxyl terminated, i.e., it may be a polyalkylene glycol of molecular weight from about 10,000 to 100,000 or, alternatively, it may be terminated with alkyl or acyl groups in manner well known in the art. Equally within the preview of the invention, there may be employed branched alkylene oxide condensates such as are obtained by reacting an alkylene oxide with an initiator containing 3 or more hydrogen reactive with alkylene oxide, such as those in hydroxyl, carboxyl and amino groups. From the standpoint of availability and low cost, starch is a particularly useful substrate for the practice of the invention and from it novel graft copolymers having a wide range of applications may be prepared.

The radiation intensity employed in the process of the invention is not critical. In order to obtain the above-indicated required dosages in reasonable lengths of time, intensities of at least 0.01, and preferably at least 0.1 megarad per hour, are desirable. Very much higher intensities, such as those obtainable in machine accelerators and run as high as 600 megarads per hour, may equally well be employed, and are especially adapted to operation by continuous process. When using such very high intensities, it may be advisable to have the polymer exposed to an atmosphere rich in oxygen or to increase the diffusion rate of oxygen in the sample by operating at an elevated temperature, in order to utilize more efficiently the greater number of free radicals formed per unit time. When it is desired to minimize degradation of the substrate without special operating conditions, it is preferred to employ radiation intensities below 10 megarads per hour. In any event, the time of irradiation and the intensity are correlated to furnish the required dosage in accordance with the well-known relationship that the dosage is the product of intensity by time.

In the second stage of the process, a graft copolymer is formed by bringing a vinyl monomer capable of undergoing free radical-induced polymerization, in aqueous dispersion and in the presence of a catalyst dissolved in the aqueous phase, into contact with the before-described substrate containing hydroperoxide radicals. The process is particularly suited to the grafting of water-soluble vinyl monomers onto the indicated substrate, in which case the indicated aqueous dispersion may be an aqueous solution, and such monomers particularly acrylic acid, are preferred. Among others may be named methacrylic acid, alkali metal salts of acrylic and methacrylic acid, acrylamide, methacrylamide, acrylonitrile and vinyl pyridine. When it is desired to graft a monomer which is insoluble in water an aqueous dispersion thereof is employed. Dispersion may be assisted by use of a cosolvent or an emulsifying agent in known manner. Thus vinyl monomers such as styrene, vinyl chloride and methyl methacrylate may be grafted onto starch or other water-dispersible polymeric substrate in accordance with the invention. It is to be understood that mixtures of vinyl monomers, instead of single monomers, may be employed, in which case the grafted chains may contain more than one type of monomer unit.

Per part of substrate employed, by weight, there may be employed in the process of the invention from 0.05 to 10 parts of vinyl monomer dispersed in from 0.5 to 100 parts of water with the added proviso that the dispersion contain no more than 20 parts of water per part of vinyl monomer.

The grafting reaction between vinyl monomer and peroxidized substrate takes place readily at room temperature if there is dissolved in the aqueous dispersion a catalyst capable of producing free radicals by reaction with hydroperoxides. Such catalysts include ferrous, titanous and mercurous salts. The amount of catalyst may be varied over a wide range depending on the activity of the specific catalyst, the reactivity of the monomer, the extent to which the substrate has been irradiated and the rate of hydroperoxide activation desired. Suitable catalyst concentrations will lie in the range of from $10^{-5}$ to 0.1 molar in the aqueous phase of the reaction system. It will be recognized that within this broad range the more active catalysts are most suitably employed in the lower concentrations while catalysts of lesser activity toward hydroperoxide decomposition should be employed in the upper end of the range. Ferrous ion has been found to be particularly effective and is preferably employed in concentrations of from $10^{-5}$ to $10^{-3}$ molar. Titanous salts and mercurous salts are also effective catalysts but require somewhat higher concentrations, such as from 0.001 to 0.1 molar to produce optimum grafting. The amount of the chosen catalyst to obtain a desired grafting rate and product characteristics in any given irradiated substrate-vinyl monomer system can readily be determined by simple preliminary tests and the results applied to production runs. The temperature during the grafting step is not critical and it is preferred to work in the temperature range of 5° to 60° C. At lower temperature the reaction is slower and at temperatures above 60° C. the efficiency of peroxide utilization is reduced.

The graft copolymerization proceeds rapidly and times of contact of as little as 5 minutes, under favorable conditions of substrate irradiation, reactivity of the vinyl monomer and catalyst concentration, may suffice to form the desired graft copolymers. In less reactive systems longer contact times may be employed and periods as long as 24 hours or more are not harmful.

At the end of the desired reaction time the graft copolymer is recovered from the reaction mixture by means suited to the reactants and products involved, such, for example, as solvent extraction, pricipitation and/or evaporation.

When the preferred embodiments of the several process elements described above are employed simultaneously, i.e., when starch is irradiated in contact with oxygen to a dosage of 0.5 to 15 megards and subsequently contacted with an aqueous solution of acrylic acid in the presence of ferrous sulfate the resulting graft copolymer will be characterized by its content of from 5 to 85 weight percent of grafted polyacrylic acid side chains, a number average molecular weight which is at least 50,000 greater than the number average molecular weight of the said grafted side chains which side chains, when recovered from such grafts by complete degradation of the starch chains with hydriodic acid and converted to methyl esters by reaction with diazomethane, yield methyl esters having a viscosity average molecular weight of at least 500,000. Graft copolymers of starch and acrylic acid so characterized as well as alkali metal salts, ammonium salts and triethyl amine salts of such graft copolymers are novel compositions and are encompassed within the invention here described.

The process of the invention will be better understood from a consideration of the following examples which are presented for purposes of illustration and are not to be construed as limitative. Unless otherwise stated, the irradiations in all of the examples were conducted in the presence of air.

EXAMPLE 1

A 2 gram portion of air dried potato starch was irradiated to a dosage of 2.2 megarads by exposure to gamma rays from spent fuel elements of intensity 450,000 rads per hour for 4.9 hours. 280 parts per million of hydroperoxide radical were thus introduced into the starch. The irradiated starch was then immersed for 15 minutes in a solution containing 5 grams of acrylamide, 10 grams of water and 1.75 milligrams of ferrous sulfate heptahydrate. At the end of this period the reaction was quenched and the formed graft copolymer precipitated by pouring the contents of the reaction vessel into excess of methanol. The precipitate was dried to a fluffy white powder and weighed. From the weight increase the copolymer was calculated to contain 48.0% of grafted acrylamide which corresponds to 92.5% vinyl monomer on the weight of starch taken. 11.3% of the graft copolymer went into solution when stirred with an excess of water for one hour at 25° C. Upon digestion in water for 5 minutes at 70° C., 87.8% of the copolymer dissolved. The polyacrylamide chains recovered from a sample of the graft by degrading the starch portion of the copolymer with hydriodic acid, had a viscosity average molecular weight of 528,000. From this value the number average molecular weight is estamated to be 190,000 (0.36 time the viscosity average molecular weight). Independent determination of the number average molecular weight of the potato starch employed iradiated to a dosage of 2.2 megarads yields a value of 182,000. From these values it is calculated that the ratio of side chains (polyacrylamide) to main chain (starch) in the copolymer is approximately 0.96.

EXAMPLES 2–4

The process of Example 1 was repeated with the exception that the radiation dosage was varied as shown in the following table. The effects on hydroperoxide formation and amount of acrylamide (based on starch) taken up are as shown.

| Example: | Radiation dose megarads | Hydroperoxide, p.p.m. | Percent monomer grafted |
|---|---|---|---|
| 2 | 0.1 | 18 | 3 |
| 3 | 3.8 | 430 | 131 |
| 4 | 30.0 | 4,200 | 150 |

EXAMPLE 5

A 2 gram portion of air dried potato starch was irradiated to a dosage of 1.7 megarads, forming a peroxidized starch containing 250 p.p.m. of hydroperoxide radical. The irradiated starch was immersed for 30 minutes in a solution containing 2.5 grams acrylamide, 5 grams water and 1.05 milligrams of ferrous sulfate heptahydrate. The formed graft copolymer was recovered from the reaction mixture by the procedure described in Example 1. It contained 50% of grafted polyacrylamide which corresponds to 100% of monomer graft, calculated on the starch weight. More than 98% of the copolymer dissolved when stirred in water at 100° C.

EXAMPLE 6

A 2 gram portion of air dried corn starch was irradiated with gamma rays from a cobalt 60 source to a dosage of 1.5 megarads whereby 225 parts per million of hydroperoxide groups were formed. The irradiated starch was immersed in a solution of 5 grams acrylamide in 4 ml. water containing 0.7 milligram dissolved ferrous sulfate heptahydrate. After 5 minutes contact time the reaction was quenched by pouring the reaction mixture into a large volume of methanol in which unreacted acrylamide is soluble. From the weight of the precipitated graft copolymer, after drying, it was calculated that the proportion of grafted acrylamide, based on the starch, was 135%.

EXAMPLE 7

A 2 gram portion of potato starch, irradiated as in Example 1 was immersed in a solution of 5 grams of acrylic acid in 10 grams of water containing 0.35 mg. dissolved ferrous sulfate heptahydrate and the mixture degassed. After a contact time of 30 minutes the reaction was terminated by pouring the reaction mixture into an excess of acetone in which the graft copolymer is insoluble whereas unreacted acrylic acid is soluble. The dried precipitate showed a weight gain, based on the starch taken of 170%.

EXAMPLE 8

A 2 gram portion of an ethylene oxide polymer having a molecular weight of approximately 20,000 (Carbowax 20M) in the form of flakes was irradiated with gamma rays to a dose of 3.5 megarads, whereby 250 parts per million of hydroperoxide radical were formed in the polyoxyethylene compound. The irradiated product was immersed in a solution of 5 grams of acrylic acid in 10 grams of water containing 1.75 mg. of dissolved ferrous sulfate heptahydrate and degassed. The reaction mixture was allowed to stand for 2 hours and poured into an excess of acetone from which the formed graft copolymer precipitated. Unreacted starting components remained in solution. The precipitate, after drying, weighed 5.18 grams which corresponds to an uptake of 159% of acrylic acid monomer based on the weight of ethylene oxide polymer taken.

EXAMPLE 9

A 2 gram portion of the ethylene oxide polymer employed in Example 8 was irradiated to a dose of 10 megarads thus introducing 700 parts per million of hydroperoxide radical into the polymer. The irradiated product was immersed for 15 minutes in a solution of 5.0 grams of acrylamide in 10 grams of water containing 2.62 mg. of dissolved ferrous sulfate heptahydrate. The reaction mixture was added to an excess of acetone to terminate the reaction and precipitate the formed graft copolymer. The dried precipitate weighed 4.70 grams which corresponds to a graft copolymer containing 135% acrylamide based on the substrate (ethylene oxide polymer) taken.

EXAMPLE 10

A 2 gram portion of potato starch irradiated to a dose of 2.0 megarads was placed in an Erlenmeyer flask with 5.0 g. acrylamide. 31 mg. of $TiCl_3$ dissolved in 10 ml. water was added, the flask stoppered, swirled gently until the acrylamide had dissolved, and set aside for 30 minutes. At the end of this period the reaction mass was taken up in 100 ml. of methanol. The solids were filtered, washed with fresh methanol, and dried to constant weight. 2.50 g. of product were recovered, equivalent to 48% graft based on the initial weight of starch.

EXAMPLE 11

A 2 gram portion of potato starch irradiated to a dose of 2.0 megarads was placed in an Erlenmeyer flask with 5.0 g. acrylamide. 66 mg. of $Hg_2(NO_3)_2$ dissolved in 10 ml. water was added, the flask swirled until the acrylamide had dissolved, and set aside overnight. At the end of this period the reaction mass was taken up in methanol, the solids filtered, washed with fresh methanol, and dried to constant weight. 3.58 g. of product were recovered, equivalent to 112% graft based on the initial weight of starch.

EXAMPLE 12

A 2 gram sample of potato starch irradiated to a dosage of 4.25 megarads and having introduced thereby 470 p.p.m. of hydroperoxide groups was added to a mixture of 5 ml. distilled methyl methacrylate and 5 ml. water containing 0.875 mg. of dissolved $FeSO_4 \cdot 7H_2O$. The suspension was degassed and held for 2 hours at 25° C. At the end of this period the reaction was quenched by adding an excess of methanol which also precipitated the formed graft copolymer. The filtered precipitate was dried and its weight gain indicated that of 37.5% of methyl methacrylate, based on the starch weight, had been grafted onto starch.

EXAMPLE 13

The process of Example 12 was repeated except that the irradiation dosage was 7.2 megarads which resulted in the introduction of 760 p.p.m. hydroperoxide groups into the starch and the reaction was quenched after only one hour. The resulting product contained 100% grafted methyl methacrylate based on the weight of starch.

EXAMPLE 14

Two grams of potato starch, containing 328 p.p.m. of hydroperoxide groups introduced by irradiation to a dose of 2.5 megarads were added to 5 ml. of water containing 0.0875 mg. $FeSO_4 \cdot 7H_2O$ and 100 mg. of the isopropyl amine salt of dodecyl benzene sulfonic acid as emulsifier. 10 ml. of distilled styrene were added and thoroughly mixed with the aqueous phase to form an emulsion. The system was degassed and held at 25° C. for 18 hours. The formed graft copolymer was isolated by precipitation with methanol followed by treatment with hot water to remove unreacted starch and with warm benzene to remove any homopolymer of styrene. The resulting graft copolymer, insoluble in water and in hydrocarbons, contained 50% by weight, based on the starch, of grafted styrene.

EXAMPLE 15

The preparation of Example 14 was repeated except that no emulsifier was employed. The resulting graft copolymer contained only 15% by weight, based on the starch, of grafted styrene.

EXAMPLE 16

A 2 gram sample polyethylene glycol of molecular weight 20,000 was irradiated to a dosage of 2.9 megarads thereby introducing 220 p.p.m. hydroperoxide groups. The irradiated product was dissolved in 5 ml. of water containing, in solution 0.35 mg. of $FeSO_4 \cdot 7H_2O$ and the mixture added to 5 ml. of distilled styrene. After degassing the reaction mixture was held at 25° C. for 16 hours. Unreacted styrene was evaporated at 50° C. and unreacted polyglycol extracted with water at 25° C. The precipitate contained the graft copolymer which was collected by filtration. It contained 40% grafted styrene based on the weight of polymeric substrate taken and was soluble in benzene. From its benzene solution clear films could be cast.

EXAMPLE 17

A 2 gram portion of the polyethylene glycol employed in Example 16 was irradiated with gamma rays to a dosage of 3.6 megarads whereby 260 p.p.m. hydroperoxide groups were introduced. The irradiated substrate was introduced into a mixture of 5 ml. methyl methacrylate and 5 ml. of water containing 0.175 mg. $FeSO_4 \cdot 7H_2O$. The reaction system was degassed and held at 25° C. for 3 hours. An excess of water was introduced which floated unreacted methyl methacrylate for mechanical removal, dissolved unreacted polyglycol and left the graft copolymer behind as a precipitate. The latter contained 95% grafted methyl methacrylate based on the weight of polyethylene glycol. It was soluble in acetone from which solvent very clear water-insoluble films were cast.

EXAMPLE 18

Potato starch was irradiated in an atmosphere of air by high voltage electrons using a Van de Graaff accelerator at a beam current of 95 microamps (radiation intensity of 1.0 mr./min.) to a total dose of 11 megarads. To 2.0 grams of the irradiated pototato starch were added a solution containing 5.0 grams of acrylic acid and $1.75 \times 10^{-5}$ grams $FeSO_4 \cdot 7H_2O$ dissolved in 5 cc. of water. The mixture was placed in a 250 ml. Erlenmeyer flask and degassed for 6 minutes and allowed to react for 20 hours at 20° C. Excess ethanol was added and the supernate containing the homopolymerized acrylic acid was separated from the solids containing the graft. The product contained 51.9% grafted acrylic acid.

EXAMPLE 19

Potato starch was irradiated with spent fuel elements at an intensity of 1 megarad per hour to a total dose of 30 megarads. 25 grams of the potato starch hydroperoxide was mixed with 30 grams acrylic acid, 99 grams of distilled water and 0.0035 gram $FeSO_4 \cdot 7H_2O$. The mixture was placed in a glass-lined, water-cooled reaction vessel and degassed for 10 minutes. The reaction temperature was held between 0°–20° C. Excess ethanol was then added and the mixture stirred until uniformly dispersed. The solids were gathered by filtration. This reaction produced a graft copolymer which consisted of 45.6 percent grafted acrylic acid.

EXAMPLE 20

Potato starch was irradiated at an intensity of 104,000 r./hr. to a total dose of 2 mr. 553 p.p.m. hydroperoxides were thus introduced and the viscosity average molecular weight of the resulting product was 163,000. 100 grams of the potato starch hydroperoxide were reacted with 144 grams acrylic acid, 856 grams distilled water and 0.030 gram $FeSO_4.7H_2O$ at 20° C. in a glass lined water cooled reaction vessel with dry $N_2$ flushing and mechanical stirring for one hour and 45 minutes. Excess ethanol was added and stirred until the ingredients were uniformly dispersed to dissolve any homopolymer of acrylic acid which may have formed. The solids were collected by centrifugation. This reaction produced a 42.2 percent acrylic acid-potato starch graft copolymer. A sample of the graft copolymer was treated with hydriodic acid to remove the starch chains by degradation. The resulting polyacrylic acid was methylated with diazomethane and the viscosity average molecular weight of the formed methyl esters found to be $2 \times 10^6$.

In many of the foregoing examples homopolymers of the vinyl compound employed were extracted from the graft copolymer. Example 21 describes treatment of the product of Example 20 to obtain a graft copolymer free of unreacted starch as well as of homopolymer.

EXAMPLE 21

8.80 grams of the product of Example 20 was boiled in 400 ml. distilled water for 15 minutes. The suspension was cooled to 25° C. and titrated to the phenolphthalein end point with approximately normal sodium hydroxide solution. The suspension became very thick and was diluted to one liter volume with distilled water. To the resulting dilute solution 1800 ml. of methanol were added to precipitate any graft copolymer insoluble in the aqueous methanol. The starch hydroperoxide employed in preparing the graft had previously been shown to be soluble in aqueous methanol solution. The precipitate obtained was washed by suspension in methanol until no more cloudiness appeared in the supernate. The product obtained was the sodium salt of an essentially pure graft copolymer of acrylic acid to starch containing 38% acrylic acid based on the total weight of copolymer.

EXAMPLE 22

Twenty five grams of corn starch was irradiated in air with spent fuel elements at an intensity of 428,000 r./hr. to a total dose of 3.0 mr. The 25 grams of corn starch hydroperoxide was mixed with 25.0 grams of acrylic acid and 50 grams of distilled water containing $4.37 \times 10^{-4}$ grams of $FeSO_4.7H_2O$. The mixture was placed in a 250 ml. Erlenmeyer flask and degassed by pumping for five minutes. The sample was reacted for 2 hours at 20° C. after which the ingredients were stirred with excess ethanol and the solids gathered by centrifugation. The reaction produced a graft copolymer which consisted of 46.5 perecent grafted acrylic acid.

EXAMPLE 23

10 grams of potato starch hydroperoxide was prepared by irradiation from a 1.5 mev. Van der Graaff accelerator at 5 mr./hr. to a total dose of 2.0 mr. This material was slurried with 10 grams of distilled acrylic acid, 20 grams of distilled water and 0.000175 gram of $FeSO_4.7H_2O$ (dispensed as 0.05 cc. of a 0.35% solution in water). The slurry had a volume of 37.0 cc. and was dispensed into a 250 ml. Erlenmeyer flask. The flask was immersed in a 20° C. water bath shaker and $N_2$ flushed for 105 minutes. The homopolymer and non-reacted monomer was removed by methanol washing. This reaction produced a graft copolymer of 15.7 polyacrylic acid.

EXAMPLE 24

Potato starch was placed in a polymerization tube and degassed to $5 \times 10^{-5}$ mm. Hg. The tube was sealed and irradiated with spent fuel elements at an intensity of 867,000 r./hr. to a total dose of 2.6 mr. The tube was opened to the atmosphere and exposed for 30 minutes. The resulting peroxidized starch was reacted with acrylic acid employing the proportions of reactants and conditions described in Example 20. A 40 percent graft of acrylic acid to starch was produced after 1¾ hours reaction time at 20° C.

EXAMPLE 25

15.0 grams of potato starch hydroperoxide, which had been irradiated in air with gamma rays to a total dose of 2 megarads, was slurried with 15.0 grams of distilled acrylic acid, 16.4 grams of distilled water, 10.0 grams of methyl alcohol and $2.6 \times 10^{-6}$ grams of $FeSO_4 \cdot 7H_2O$. Total volume of the slurry was 56.0 ml., acrylic acid concentration was 3.72 moles/liter, ferrous ion concentration was $1.68 \times 10^{-5}$ moles/liter. The sample was reacted for 3.5 hrs. in a water bath shaker at 20° with dry $N_2$ flushing. Upon separation of unreacted monomer and polyacrylic acid by methanol extraction the product was found to contain 23 percent acrylic acid based on the total weight of the isolated product. The viscosity of the reaction mixture containing methanol in the aqueous solution during the grafting step was markedly lower than that of similar reaction mixtures employing water alone as the solvent.

The process of the invention provides an economical method for preparing grafted copolymers of widely varying characteristics employing high energy radiation. The irradiation may be conducted at ambient temperatures and with the polymeric substrate in its normal air dried condition and the efficiency of hydroperoxide formation is high. The peroxidized polymers formed by irradiation are quite stable which permits flexibility of plant arrangement and operation scheduling. By variations in the choice of vinyl monomer and reaction conditions graft copolymers are obtained which are suitable for use in molding compounds, films, protective coatings, textile sizes, thickening agents, detergent compositions, and the like. The copolymers based on water-dispersible to water-soluble vinyl monomers have been found particularly useful as flocculating agents and water loss inhibitors.

Copolymers made from intermediate hydroperoxides by the process of the present invention differ markedly in properties from copolymers obtained by the chemically induced grafting of vinyl monomers to substrates in the presence of peroxide catalysts with or without the addition of promoters. By way of illustration the product of Example 1, containing 48% grafted acrylamide was compared with the product obtained by grafting acrylamide onto potato starch in accordance with a method proposed in the prior art. Specifically the comparison graft copolymer was prepared by mixing 66.7 parts by weight of acrylamide and 100 parts of starch in 250 parts of an aqueous solution of 0.4 part of $FeSO_4 \cdot 7H_2O$ and 0.66 part of 50% hydrogen peroxide and maintaining the ingredients in contact at room temperature for 3 hours. The resulting graft copolymer contained 45% grafted acrylamide. The number average molecular weight of the grafted polyacrylamide side chains was determined as described in Example 1 above and found to be 23,000 as contrasted to the value of 190,000 there reported. It is evident that radiation induced peroxidized grafting proceeds in an entirely different manner from chemically induced grafting. In the important property of water-solubility it was found that 87.8% of the radiation induced graft dissolved on digestion for 5 minutes in water at 70° C., whereas only 27% of the product formed by the chemically catalyzed reaction would go into solution even after 16 hours digestion at 70° C.

The product in accordance with the present invention is more thermally stable than that obtained by prior art processes and can be oven dried at 110° C. without development of color.

The water-soluble graft copolymers of the invention are efficient flocculating agents and may be employed in any of the fields where such agents are used to flocculate finely divided dispersed solids in liquid media so that the liquid will be clarified and/or the suspended matter recovered or deposited on a desired surface. Among such uses of flocculating agents may be named the purification of waste waters in the process industries, the clarification of water for industrial and domestic use, filler-retention aids in paper manufacture, and the processing of ores in the recovery of metals therefrom.

The flocculating efficiency of the products of the invention was illustrated by making a 0.2% stock solution of the product of Example 1 in distilled water and adding measured quantities thereof to 100 ml. portions of a 2% aqueous suspension of colloidal kaolin clay in graduated cylinders. The cylinders were stoppered, inverted 5 times to mix the flocculating agent through the suspension and then set upright. After 90 seconds the liquid layers above the settling layer of flocculated clay were observed for clarity and their volumes noted. By way of comparison the graft copolymer prepared in accordance with the prior art and characterized above was tested in the same manner. In a control series, water containing no flocculating agent was added in the same manner as the stock solution so that all final comparisons were made at the same dilution. The results obtained are presented in Table I.

TABLE I

| Ml. of 0.2% flocculating agent added/100 ml. suspension | Volumes (ml.) of separated liquid and appearance after 90 seconds when the agent is— | | |
|---|---|---|---|
| | Product of Ex. 1 | Product of prior art process | Control |
| 1 | None | None | None. |
| 2 | do | do | Do. |
| 3 | 85; very cloudy | do | Do. |
| 10 | 88; slightly cloudy | 50; very cloudy | Do. |
| 12 | 88; clear | do | Do. |
| 24 | | 69; slightly cloudy | Do. |

The product of Example 1 is seen to have a pronounced flocculating effect at a concentration of as little as 60 parts per million (on volume basis in the kaolin suspension) being much more effective than the compared product at a concentration of 200 p.p.m.

The product of Example 1 is even more effective in flocculating carbon black from aqueous suspension. The addition of only 1 ml. of the stock solution described above to 100 ml. of a 2% suspension of carbon black caused the carbon to settle so completely in 90 seconds that 90 ml. of clear water were layered above the settled floc.

Products made from irradiated starch to which acrylamide is grafted with a ferrous ion catalyst may also, for example, be used to flocculate titanium dioxide, bentonite and coal.

Compositions obtained in accordance with the invention, and particularly radiation induced grafts of acrylic acid or methacrylic acid to starch and containing from 5% to 65% of the grafted acid have been found particularly effective settling agents for use in the clarifying of alkali aluminate solutions in the wet alkali aluminate process for the production of aluminum from bauxite ores. In this process finely ground bauxite is digested under pressure with sodium hydroxide solution which puts the aluminum in solution as sodium aluminate. The insolubles, generally referred to as "red mud" and comprising chiefly ferric oxide, must be removed from the digestion liquor before the aluminum can be precipitated therefrom as alumina. In commercial practice starch is usually added to the slurry to flocculate the suspended solids and hasten their settling after which the clarified liquor is decanted or filtered. In accordance with the present invention a graft copolymer of starch and acrylic or methacrylic acid, or a composition comprising starch and such a graft copolymer, is employed as the flocculating agent in the settling of red mud from bauxite digestion liquors. The graft copolymers are very much more efficient than starch as flocculants for red mud. In comparative tests it has been found that one pound of starch-acrylic acid graft copolymer can replace from 10 to 60 pounds of starch, depending upon the composition of the copolymer and the bauxite under test, with equivalent flocculation rates. It is thus possible to obtain faster settling rates with the introduction of less organic matter into the process than with starch. Since in the wet alkali aluminate process the spent alkali liquor after precipitation of alumina is recycled to digest more bauxite organic matter added as flocculant accumulates in the system and minimization of the amount added is greatly to be desired. It is further to be noted that the iron oxide flocs formed when employing the graft copolymers of the present invention as flocculating agent are larger than those formed when employing starch which makes for easier filtration of the dissolved caustic aluminate solution.

A suspension simulating the suspension of insoluble ore particles obtained in wet alkali aluminate process was prepared to determine the effectiveness of the graft copolymers of the invention as flocculating agents. For this purpose a simulated spent caustic liquor was first formulated by dissolving in approximately 500 ml. of boiling water the ingredients tabulated below and then making the solution up to 1 liter with water.

INGREDIENTS PER LITER OF ARTIFICIAL SPENT LIQUOR

| | Grams |
|---|---|
| NaOH | 169.8 |
| $Na_2CO_3$ | 39.7 |
| $Na_2SiO_3$ | 1.89 |
| $Al_2O_3$ | 66.8 |

For each 200 ml. portion of simulated alkali aluminate digestion liquor 152 ml. of the above described spent liquor, 19 grams of finely ground Jamaican bauxite, and 0.12 gram of calcium oxide were introduced into an autoclave, heated rapidly to 200° C. and held at that temperature for 30 minutes. The autoclave was discharged and slurry brought to a volume of 200 ml. with boiling water in a 250 ml. graduated beaker. A measured quantity of the flocculating agent under test, in the form of a 3 percent (weight/volume) solution in 5% sodium hydroxide solution, was quickly stirred into the suspension and the whole transferred to a 250 ml. graduated cylinder immersed in an oil bath kept at 94° C. The contents were gently stirred with a slow speed (10 r.p.m.) paddle type stirrer and the rate of settling noted by observing the volume of supernate above the settling suspension after various time intervals.

TABLE III

| | Control J | 26 | 27 | 28 | 29 | 30 | 31 | Control A | 32 | 33 | 34 | 35 |
|---|---|---|---|---|---|---|---|---|---|---|---|---|
| Bauxite type | (¹) | (¹) | (¹) | (¹) | (¹) | (¹) | (¹) | (²) | (²) | (²) | (²) | (²) |
| Flocculant: | | | | | | | | | | | | |
| (Starch and vinyl) monomer type³ | C | C-A | C-A | P-A | P-A | C-A | ⁴C-A | C | P-A | P-A | P-A | P-M |
| Vinyl monomer | None | ⁵46.5 | ⁵46.5 | ⁶45.6 | 65 | 41.8 | 41.8 | None | 42 | 48 | ⁷15 | 44 |
| Ml. flocculant solution | 1.5 | 0.035 | 0.07 | 0.07 | 0.07 | 0.14 | 0.14 | 1.88 | 0.03 | 0.06 | 0.09 | 0.03 |
| Lbs. flocculant/ton bauxite | 4.8 | 0.11 | 0.22 | 0.22 | 0.22 | 0.44 | 0.44 | 6.0 | 0.10 | 0.20 | 0.30 | 0.10 |
| Volume (ml.) supernate, after— | | | | | | | | | | | | |
| 20 sec | 3 | 6 | 65 | 44 | 10 | 4 | 20 | 6 | 24 | 38 | 12 | 18 |
| 40 sec | 6 | 8 | 102 | 68 | 20 | 4 | 80 | 14 | 40 | 70 | 26 | 26 |
| 60 sec | 13 | 14 | 125 | 87 | 32 | 8 | 110 | 28 | 56 | 80 | 36 | 40 |
| 100 sec | 32 | 21 | 140 | 122 | 44 | 10 | 134 | 60 | 86 | 100 | 62 | 60 |
| 200 sec | 82 | 40 | 155 | 137 | 94 | 22 | 150 | 90 | 136 | 140 | 108 | 102 |
| 300 sec | 104 | 59 | 157 | 142 | 128 | 40 | 160 | 108 | 148 | 155 | 128 | 122 |
| 400 sec | 116 | 73 | 160 | 152 | 148 | 62 | 160 | 118 | 156 | 160 | 144 | 134 |
| 500 sec | 122 | 88 | 165 | 157 | 154 | 90 | 160 | 126 | 166 | 160 | 150 | 142 |
| 600 sec | 124 | 98 | 165 | 157 | 158 | 120 | 160 | 132 | 166 | 160 | 154 | 150 |

¹ Jamaican.  ² Arkansas.  ³ C=Corn starch; P=Potato starch; A=Acrylic acid; M=Methylacrylic acid.
⁴ Flocculant contained additionally 0.44 lbs./ton corn starch.  ⁵ Product of Example 22.  ⁶ Product of Example 19.  ⁷ Product of Example 23.

The standard of performance chosen was the settling rate obtained when 1.5 ml. of 3% starch solution was employed as the flocculating agent. This corresponds to 4.8 lbs. of starch per ton of fresh bauxite used in preparing the test suspension and is representative of the amount of starch employed in the processing of Jamaican bauxite in the industry. The flocculation rates obtained by this test with representative starch-acrylic acid grafts are shown in Examples 26 to 31 presented in Table III.

The tabulation makes it at once evident that graft copolymers in accordance with the invention are very much more efficient flocculants than the presently employed starch.

That the effect is not peculiar to the flocculation of red mud from Jamaican bauxite is evidenced by tests run on an Arkansas bauxite. In flocculating red mud from this bauxite it is the industry practice to employ 6 lbs. of starch per ton of bauxite, and this dosage was employed in the control test. Examples 31 to 35 show how much more efficient than starch are graft copolymers in accordance with the invention with respect to the clarification of red mud suspensions from Arkansas bauxite.

Mixtures of graft copolymers in accordance with the invention and untreated starch (Example 31) have also been found to be useful flocculants for bauxite red muds and such mixtures containing as much as 70% starch with correspondingly as little as 30% graft copolymer have given excellent results in such flocculation.

Water-soluble graft copolymers prepared from vinyl monomers and starch or a polyoxyalkylene ether of molecular weight from 1,000 to 100,000 containing from 2 to 3 carbon atoms in the oxyalkylene units by a post-grafting technique in which hydroperoxide formation is not involved have also been found to have excellent flocculating action. Such copolymers may be prepared by irradiating, with high energy ionizing radiation, a substrate comprising moist starch or polyoxyalkylene ether as defined in the absence of free oxygen to a dosage of from 0.1 to 20 megarads and subsequently bringing a water-dispersible vinyl monomer into contact with the irradiated substrate. The oxygen exclusion may be accomplished by thorough degassing or by flushing the sample with nitrogen in conventional manner. If the sample has been air dried in atmosphere of normal humidity it will retain enough moisture to be activated by the irradiation. The following example describes the preparation of a graft copolymer by this technique and illustrates its use as a flocculating agent.

EXAMPLE 36

A 9 gram sample of air dried cornstarch was placed in a polymerization tube fitted with a stopcock. The sample was degassed and irradiated to a dose of 7 megarads using cobalt-60 gamma-rays. Immediately after irradiation a solution of 10 grams of acrylamide monomer in 20 grams of water was injected into the tube and contacted with the irradiated starch for 30 minutes at 25° C. Reaction of the starch and acrylamide occurred with evolution of heat. The graft copolymer was precipitated in excess methanol. The dried precipitate was a fluffy, water-soluble powder and weighed 12.45 grams which corresponds to a graft copolymer of 38.33% acrylamide based on the initial weight of substrate.

Solutions of this graft copolymer in water were prepared and compared with graft copolymer of similar composition made in accordance with the prior art process detailed hereinbefore. Not only was the molecular weight of grafted polyacrylamide side chain substantially larger than that of the product made in accordance with the prior art process but the water solubility of the graft prepared by the present method was significantly better. Stability of the product as evidenced by color change on heating was also much better. The product of Example 36 was subjected to flocculating tests similar to those described in connection with Table I above. The results are shown in Table IV.

TABLE IV

| Ml. of 0.2% flocculating agent added/100 ml. suspension | Volume (ml.) of separated liquid and appearance after 90 seconds when the agent is— | |
|---|---|---|
| | Product of Example 36 | Control |
| 0.2 cc | 64; very cloudy | None. |
| 0.5 cc | 65; cloudy | Do. |
| 1.0 cc | do | Do. |
| 2.0 cc | 65; slightly cloudy | Do. |
| 3.0 cc | 65; clear | Do. |

What is claimed is:

1. A process for flocculating solids from their finely divided suspensions in aqueous media which comprises introducing into the suspension a graft copolymer prepared by (1) contacting oxygen with a water-dispersible polymeric substrate selected from the group consisting of starch, casein, algin, dextran, dextrin, polyvinyl alcohol, and a polymeric condensate of a 2 to 3 carbon alkylene oxide, irradiated with high energy ionizing radiation to a dosage of from 0.1 to 30 megarads whereby hydroperoxide groups are introduced into said polymers and (2) subsequently contacting the peroxidized polymeric substrate with an aqueous dispersion of a vinyl monomer capable of free radical induced polymerization in the presence of dissolved catalyst capable of producing free radicals by reaction with hydroperoxides.

2. The process of claim 1 wherein the grafted side chains of the said copolymer comprise from 5% to 85% by weight thereof and wherein the viscosity average molecular weight of the grafted side chains is at least 500,000.

3. The process of claim 1 wherein the said solids are selected from the group consisting of kaolin, titanium dioxide, bentonite and coal, the said polymeric substrate is starch, the said catalyst is a ferrous salt, the said vinyl monomer is acrylamide.

4. The process of claim 1 wherein the said finely divided suspension is a caustic aluminate liquor obtained in the wet alkali aluminate method of producing alumina from aluminous ore, the said polymeric substrate is starch, the said catalyst is a ferrous salt and the said vinyl monomer is selected from the group consisting of acrylic acid and methacrylic acid.

5. The process of claim 1 wherein the said finely divided suspension is a caustic aluminate liquor obtained in the wet alkali aluminate method of producing alumina from aluminous ore, the said polymeric substrate is starch, the said catalyst is a ferrous salt, and the said vinyl monomer is acrylic acid.

6. The process of claim 5 wherein the said graft copolymer is employed in admixture with starch, the said mixture containing at least 30 percent by weight of said graft copolymer.

7. The process of claim 4 wherein the grafted side chains of the said graft copolymer comprise from 5 to 85 weight percent thereof, the difference between the number average molecular weights of the copolymer and of the grafted side chain is at least 50,000, and the length of the grafted side chains is such that the viscosity average molecular weight of the methyl esters corresponding thereto is at least 500,000.

8. The process of flocculating solids from their finely divided suspensions in aqueous media which comprises introducing into the suspension a graft copolymer obtained by irradiating in the absence of free oxygen a moist polymeric compound selected from the group consisting of starch and polyoxyalkylene ethers of molecular weight from 10,000 to 100,000 containing from 2 to 3 carbon atoms in the oxyalkylene units with high energy ionizing radiation to a dosage of from 0.1 to 20 megarads to introduce reactive cites into the polymeric compound and subsequently contacting the irradiated polymeric compound with a water-dispersible vinyl monomer capable of free radical induced polymerization.

9. The process of claim 3 in which the said solid is kaolin.

10. The process of claim 1 wherein the polymeric substrate is starch and the vinyl monomer is selected from the group consisting of acrylamide, acrylic acid and methacrylic acid.

11. The process of claim 1 wherein the said finely divided suspension is a caustic aluminate liquor obtained in the wet alkali aluminate method of producing alumina from aluminous ore, the said polymeric substrate is starch, and the said vinyl monomer is selected from the group consisting of acrylic acid and methacrylic acid.

References Cited

UNITED STATES PATENTS

| | | | |
|---|---|---|---|
| 3,085,853 | 4/1963 | Lesinski | 210—54X |
| 3,088,931 | 5/1963 | Scanley | 204—154 |
| 3,095,391 | 6/1963 | Brockway | 260—17.4 |
| 3,115,418 | 12/1963 | Magat | 260—877 |
| 3,137,674 | 6/1964 | Maraus | 260—877X |
| 3,138,564 | 6/1964 | Borunski | 260—17.4 |
| 3,143,521 | 8/1964 | Thompson | 260—877 |
| 3,194,757 | 7/1965 | Sullivan | 210—54X |
| 3,219,578 | 11/1965 | Cruickshank | 210—54X |
| 3,285,849 | 11/1966 | Watanabe | 210—54X |
| 3,337,649 | 8/1967 | Black | 260—877 |

FOREIGN PATENTS

| | | | |
|---|---|---|---|
| 869,501 | 5/1961 | Great Britain | 260—17.4 |

OTHER REFERENCES

Yorita et al., Graft Polymerization to Cellulose in Annual Report of the Japanese Association for Radiation Research on Polymers, vol. 1, 1958, pp. 79–89.

Charlesby, Radiation Effects in Materials, Pergamon Press, 1960, pp. 235–238.

Chapiro, Radiation Chemistry of Polymer Systems, 1962, Wiley Pub. Co., pp. 601 to 602.

WILBUR L. BASCOMB, JR., Primary Examiner

S. J. EMERY, Assistant Examiner

U.S. Cl. X.R.

23—143; 260—877, 17.4, 233.3; 204—159.12; 209—5; 210—54